US012694795B2

(12) United States Patent

Kimberly et al.

(10) Patent No.: US 12,694,795 B2

(45) Date of Patent: Jul. 28, 2026

(54) SYSTEMS AND METHODS FOR CONFIRMING IDENTITY AND LOCATION OF AN AIRCRAFT WITHIN AN AIRSPACE

(71) Applicant: THE BOEING COMPANY, Chicago, IL (US)

(72) Inventors: Gregory Kimberly, Seattle, WA (US); Jae H. Kim, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 565 days.

(21) Appl. No.: 17/405,417

(22) Filed: Aug. 18, 2021

(65) Prior Publication Data

US 2023/0130515 A1 Apr. 27, 2023

(51) Int. Cl.
| | |
|---|---|
| *G08G 5/00* | (2025.01) |
| *B64C 39/02* | (2023.01) |
| *B64D 27/24* | (2024.01) |
| *G08G 5/20* | (2025.01) |
| *G08G 5/72* | (2025.01) |

(52) U.S. Cl.
CPC ........... *G08G 5/727* (2025.01); *B64C 39/024* (2013.01); *G08G 5/20* (2025.01)

(58) Field of Classification Search
CPC .... G08G 5/0017; G08G 5/0004; G08G 5/727; G08G 5/20; G08G 5/58; G08G 5/26; G08G 5/55; B64C 39/024; B64D 27/24; G01S 5/0244; G01S 3/802; G01S 5/0027; G01S 5/0264
See application file for complete search history.

(56) References Cited

U.S. PATENT DOCUMENTS

| | | | | |
|---|---|---|---|---|
| 10,785,562 | B1 * | 9/2020 | Weekly | ................... G10L 15/22 |
| 2009/0304198 | A1 * | 12/2009 | Herre | .................... H04M 9/082 |
| | | | | 381/66 |
| 2017/0278410 | A1 | 9/2017 | Byers | |
| 2018/0091908 | A1 | 3/2018 | Goel | |
| 2018/0197420 | A1 | 7/2018 | Banga | |
| 2019/0051197 | A1 | 2/2019 | Campos | |
| 2020/0096624 | A1 | 3/2020 | Brabant | |
| 2020/0312159 | A1 | 10/2020 | Hegranes | |
| 2020/0348904 | A1 * | 11/2020 | Lan | ......................... G06F 3/165 |

(Continued)

FOREIGN PATENT DOCUMENTS

JP 2008-130047 6/2008

OTHER PUBLICATIONS

Extended European Search Report for EP 22173779.4-1213, dated Oct. 27, 2022.
Machine translation of JP 2008-130047.

*Primary Examiner* — Anne Marie Antonucci
(74) *Attorney, Agent, or Firm* — Joseph M. Butscher; Carroll, Hoette & Butscher, LLC

(57) ABSTRACT

A system includes an aircraft including a position sensor configured to output a position signal regarding a position of the aircraft within an airspace, and a propulsion system configured to output a position confirmation signal regarding the position of the aircraft within the airspace. A method includes outputting, by a position sensor of an aircraft, a position signal regarding a position of the aircraft within an airspace; and outputting, by a propulsion system of the aircraft, a position confirmation signal regarding the position of the aircraft within the airspace.

20 Claims, 6 Drawing Sheets

(56)            References Cited

U.S. PATENT DOCUMENTS

2021/0181355 A1 *   6/2021  Dolan ................... G08G 5/0082
2021/0225182 A1     7/2021  Wyrobek
2022/0324564 A1 *  10/2022  Meade ............... B65D 83/0055

* cited by examiner

SYSTEMS AND METHODS FOR CONFIRMING IDENTITY AND LOCATION OF AN AIRCRAFT WITHIN AN AIRSPACE

FIELD OF THE DISCLOSURE

Examples of the present disclosure generally relate to systems and methods for confirming an identity and location of an aircraft within an airspace.

BACKGROUND OF THE DISCLOSURE

Aircraft, such as commercial aircraft, military aircraft, unmanned aerial vehicles (UAVs), such as drones, and the like may fly within an airspace. Radar can be used to track positions of aircraft within the airspace. As another example, an automatic dependent surveillance broadcast (ADS-B) system can be used to communicate positions of the aircraft within the airspace.

ADS-B can be an essential protocol for modern air traffic management. However, ADS-B may also be insecure. For example, adversarial, intentional and unintentional interference, or otherwise unscrupulous actors can spoof ADS-B transmissions. Further, such actors can also attempt to jam ADS-B out transmissions.

SUMMARY OF THE DISCLOSURE

A need exists for a system and method for securely and accurately confirming an identity and location of an aircraft within an airspace. Further, a need exists for adding cyber resilience to tracking systems, such as ADS-B systems.

With those needs in mind, certain examples of the present disclosure provide a system including an aircraft having a position sensor configured to output a position signal regarding a position of the aircraft within an airspace, and a propulsion system configured to output a position confirmation signal regarding the position of the aircraft within the airspace.

In at least one example, the system also includes a tracking sub-system including a tracking control unit configured to receive the position signal and the position confirmation signal. The tracking control unit is further configured to compare the position signal and the position confirmation signal to assess an accuracy of the position signal.

In at least one example, the position sensor is an automatic dependent surveillance-broadcast (ADS-B) communication device.

The aircraft can be an unmanned aerial vehicle (UAV), such as a drone, a commercial aircraft, or a military aircraft.

In at least one example, the propulsion system includes a motor in communication with a propulsion control unit. The motor can be an electric motor. In at least one example, the propulsion control unit encodes a location signal on an audio signal output by the motor to provide the position confirmation signal.

As an example, the location signal includes a location of the aircraft within the airspace, and an identification of the aircraft. As a further example, the location signal also includes a timestamp.

Certain examples of the present disclosure provide a method including outputting, by a position sensor of an aircraft, a position signal regarding a position of the aircraft within an airspace; and outputting, by a modulation of a propulsion system of the aircraft, a position confirmation signal regarding the position of the aircraft within the airspace. In at least one example, the method also includes receiving, by a tracking control unit of a tracking sub-system, the position signal and the position confirmation signal; and comparing, by the tracking control unit, the position signal and the position confirmation signal to assess an accuracy of the position signal.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for confirming an identity of an aircraft within an airspace. The systems and methods are configured to modulate an audio signature of an aircraft (such as output from a propulsion system, such as may have an electric motor) to confirm the identity and location of the aircraft.

Rather than using additional hardware, certain examples of the present disclosure leverage existing sensors and actuators, thereby providing cost-effective and efficient systems and methods. Additionally, because the systems and methods utilize physical attributes of the behavior of the aircraft, spoofing information would essentially require an equivalent platform be inserted into the same physical space, which would vastly increase the cost of spoofing relative to existing spoofing methods.

Certain examples of the present disclosure provide systems and methods that are configured to modulate an audio signature of an aircraft (such as output from a propulsion system) to confirm the identity and location of the aircraft. As an example, the propulsion system includes a motor in communication with a propulsion control unit that encodes a location signal on an audio signal output by the motor to provide a position confirmation signal.

Figure 1:
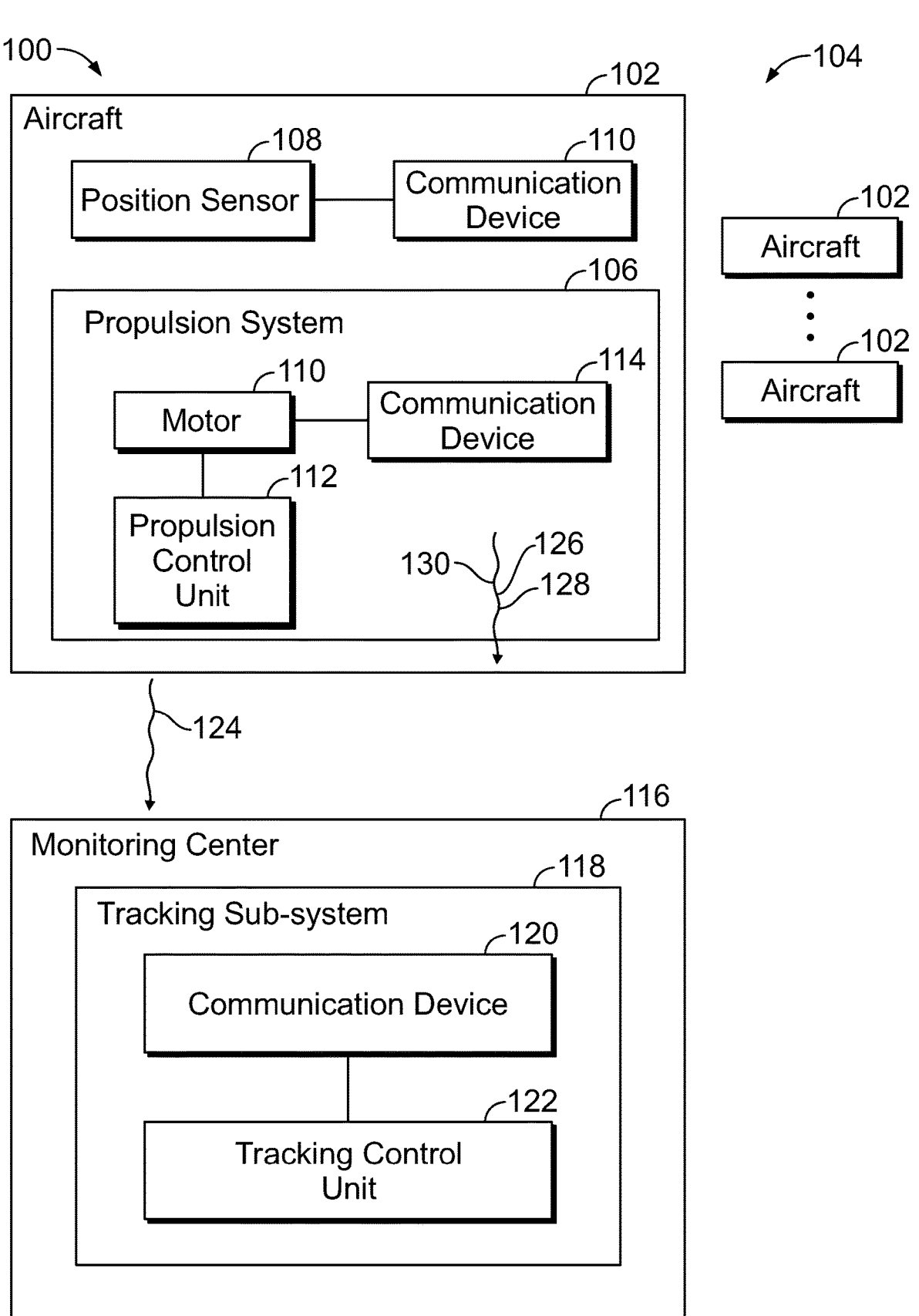
FIG. 1 illustrates a schematic block diagram of a system for confirming an identity of aircraft within an airspace, according to example of the present disclosure.

FIG. 1 illustrates a schematic block diagram of a system 100 for confirming an identity of aircraft 102 within an airspace 104, according to example of the present disclosure. The aircraft 102 are tracked within the airspace 104. The aircraft 102 can be commercial aircraft, military aircraft, UAVs, and/or the like. The aircraft 102 includes a propulsion system 106 and a position sensor 108 (such as may be or otherwise include a position transmitter). The position sensor 108 is in communication with a communicative device 110, such as through one or more wired or wireless connections. The communication device 110 can be a transceiver (transmitter/receiver), an antenna, a radio unit, and/or the like.

In at least one example, the position sensor 108 is separate and distinct from the propulsion system 106. For example, the propulsion system 106 does not include the position sensor 108.

In at least one example, the propulsion system 106 includes a motor 110 in communication with a propulsion control unit 112, such as through one or more wired or wireless connections. As an example, the motor 110 is an electric motor. As another example, the motor 110 can be, or least part of, an engine. The motor 110 and/or the propulsion control unit 112 is in communication with a communication device 114, such as through one or more wired or wireless connections. The communication device 110 can be a transceiver (transmitter/receiver), an antenna, a radio unit, and/or the like. The propulsion control unit 112 controls operation of the motor 110. Each of the aircraft 102 within the airspace 104 can be configured as shown in FIG. 1. Optionally, less than all of the aircraft 102 within the airspace 104 can be configured as shown in FIG. 1. The airspace 104 can include more or less aircraft 102 than shown.

A monitoring center 116 is configured to track locations of the aircraft 102 within the airspace 104. The monitoring center 116 can be land-based, air-based, sea-based, or space-based (such as a satellite). The monitoring center 116 includes a tracking sub-system 118 having a communication device 120 in communication with a tracking control unit 122, such as through one or more wired or wireless connections. The communication device 120 can be a transceiver (transmitter/receiver), an antenna, a radio unit, one or more microphones, and/or the like. The communication device 120 is configured to receive signals from the aircraft 102 to identify, locate, and confirm the location of the aircraft 102 within the airspace 104, as described herein. In at least one example, the tracking sub-system 118 can be onboard at least one of the aircraft 102 within the airspace 104. For example, a plurality of the aircraft 102 can each include a tracking sub-system 118.

The position sensor 108 of the aircraft 102 is configured to be tracked by the tracking sub-system 118. In at least one example, the position sensor 108 is an automatic dependent surveillance-broadcast (ADS-B) communication device, and the tracking sub-system 118 is configured to track the position sensor 108 through an ADS-B protocol. As another example, the position sensor 108 is a global positioning system sensor. As another example, the tracking sub-system 118 can be or otherwise include radar that is configured to track the position sensor 108 and/or other portions of the aircraft 102.

As noted, in at least one example, the tracking sub-system 118 is an ADS-B tracking sub-system. In such an example, the tracking sub-system 118 determines a current position of the aircraft 102 via satellite navigation through a positional signal of the aircraft 102 output by the position sensor 108. The position sensor 108 can be or include a transmitter that periodically outputs information about the aircraft 102, such as identification details, current position, current altitude, and current velocity. The tracking sub-system 118 receives the transmitted position signal from the position sensor 108 to determine a current and real time location (such as may include position, heading, velocity, and the like) of the aircraft 102. Alternatively, the tracking sub-system 118 can be a radar system or other such system that is configured to track the position of the aircraft 102.

The position sensor 108 outputs a position signal 124, via the communication device 110. The position signal 124 is indicative of one or more of the position, altitude, heading, acceleration, velocity, and/or the like of the aircraft 102. The communication device 120 of the tracking sub-system 118 receives the position signal 124 from the aircraft 102 via the communication device 120. The tracking control unit 122 analyzes the position signal 124 to determine the location of the aircraft 102 within the airspace 104.

In order to confirm the location of the aircraft 102 within the airspace 104, as detected by the tracking sub-system 118 analyzing the received position signal 124, the propulsion system 106 of the aircraft 102 outputs a separate position confirmation signal 126 from the communication device 114. The tracking sub-system 118 receives the position confirmation signal 126 via the communication device 120. The tracking control unit 122 analyzes the position confirmation signal 126. If the position confirmation signal 126 conforms or otherwise is in agreement with the position signal 124, the tracking control unit 122 confirms that the location of the aircraft 102 within the airspace 104 as indicated from the position signal 124 is accurate. If, however, the position confirmation signal 126 differs from (for example, indicates a different location) the position signal 124, the tracking control unit 122 determines that the position signal 124 is not accurate (for example, may be spoofed).

The position confirmation signal 126 is separate and distinct from the position signal 124. The position signal 124 is output by the position sensor 108, whereas the position conformation signal 126 is output by the propulsion system 106. The position sensor 108 does not output the position confirmation signal 126.

In at least one example, the propulsion system 106 encodes a location signal 128 on an audio signal 130 (for example, an audio or acoustic signature) output of the motor 110. For example, the position confirmation signal 126 includes the location signal 128 on the audio signal 130 output by the motor 110. The location signal 128 includes a location of the aircraft 102 within the airspace 104, and an identification of the aircraft 102. The location of the aircraft 102 can be determined by the position sensor 108, and/or another position sensor in communication with the propulsion control unit 112, which attaches, assigns, adds, or otherwise includes the location of the aircraft 102 on the location signal 128. The propulsion control unit 112 also attaches, assigns, adds, or otherwise includes the identification of the aircraft 102 on the location signal 128. In at least one example, the location signal 128 can also include a timestamp. For example, the propulsion control unit 112 can include or otherwise be in communication with a timer, which can attach, assign, add, or otherwise include the timestamp on the location signal 128. Optionally, the location signal 128 may not include the timestamp. Accordingly, the position confirmation signal 126 output by the propulsion system 106 includes a location and identification of the aircraft 102 within the airspace 104, and may optionally include a timestamp indicating a time of the aircraft 102 at a current location.

In at least one example, the motor 110 is an electric motor. As such, the propulsion system 106 can be an electric propulsion system. The propulsion control unit 112 is able to modulate an output of the electric motor. For example, the motor 110 generates noise. The propulsion control unit 112 modulates the motor 110 and embeds the position confirmation signal 126 in the modulated noise signal output by the motor 110. The propulsion control unit 112 encodes the location signal 128 on the audio signal 130 to provide the position confirmation signal 126. Optionally, the propulsion system 106 may not be an electric propulsion system. For example, the propulsion system 106 can include gas turbine engines.

The position confirmation signal 126 can be an audio signal, which is received by the communication device 120, such as may include one or more microphones. In at least one example, the position confirmation signal 126 is an encoded signal in an audio channel. The propulsion control unit 112 can modulate an amplitude or frequency of the position confirmation signal 126 in order to define a desired audio channel.

In at least one example, the system 100 uses inexpensive audio sensors to detect the position confirmation signal 126. For example, as noted, the communication device 120 can include one or more microphones (in addition to one or more ADS-B receivers, for example). By detecting and analyzing the position confirmation signal 126, the system 100 enhances cyber resilience of the tracking sub-system 118, such as may be or otherwise track the aircraft 102 through ADS-B. The propulsion control unit 112 modulates the output of drive units, such as the motor 110, to encode the location signal 128 on the audio signal 130 to form the position confirmation signal 126. By encoding location information for the aircraft 102 within the airspace 104 in this way, examples of the present disclosure provide a system and method that is cost-effective, and which may be crowd sourced.

As described herein, the system 100 includes the aircraft 102 including the position sensor 108 configured to output the position signal 124 regarding a position of the aircraft 102 within the airspace 104, and the propulsion system 106 configured to output the position confirmation signal 126 regarding the position of the aircraft 102 within the airspace 104. The tracking sub-system 118 includes the tracking control unit 122 configured to receive the position signal 124 and the position confirmation signal 126. The tracking control unit 122 is further configured to compare the position signal 124 and the position confirmation signal 126 to assess the accuracy and reliability of the position signal 124.

In at least one example, the tracking sub-system 118 can include multiple microphones as the communication device 120. The multiple microphones can physically locate the source of the signal 126, which provides an efficient and inexpensive way to tie the signal 126 to a specific direction and region in the airspace 104.

Figure 2:
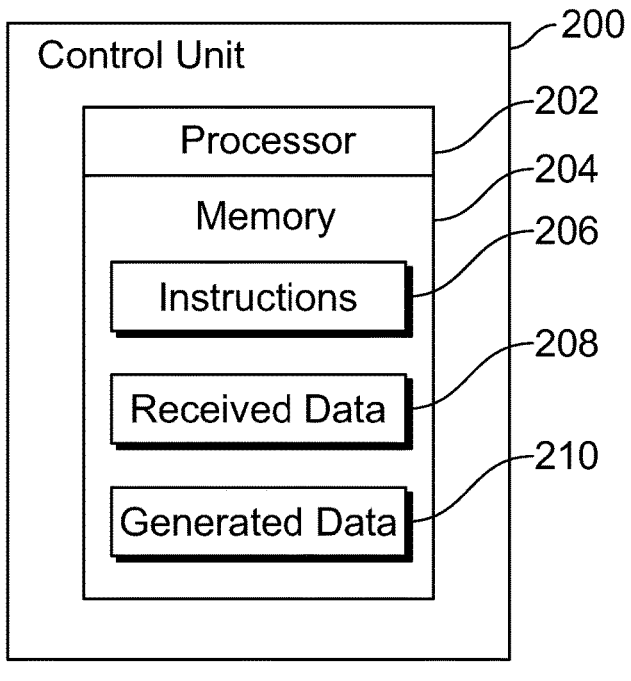
FIG. 2 illustrates a schematic block diagram of a control unit, according to an example of the subject disclosure.
Figure 5:
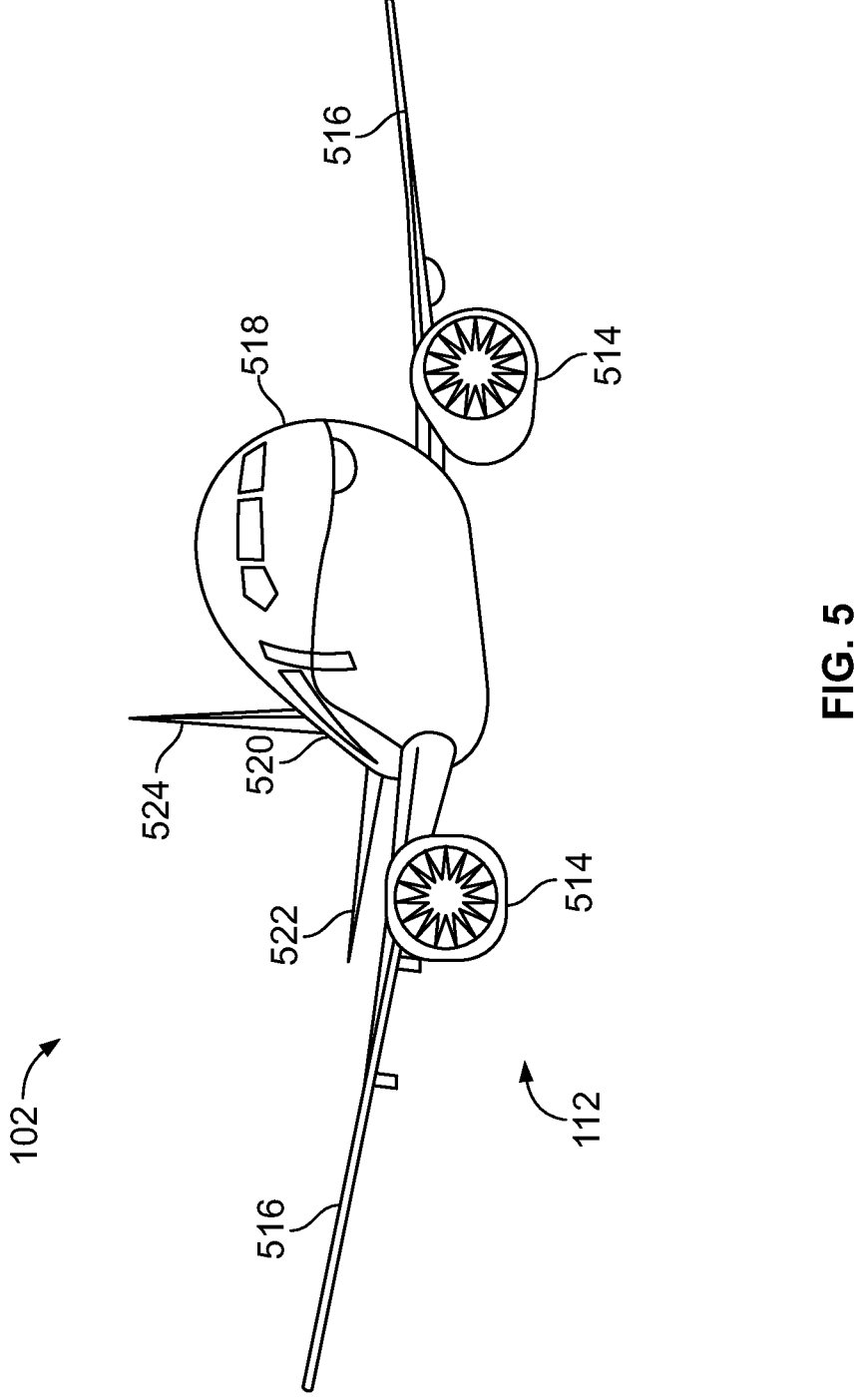
FIG. 5 illustrates a front perspective view of an aircraft, according to an example of the present disclosure.

FIG. 2 illustrates a schematic block diagram of a control unit 200, according to an example of the subject disclosure. In at least one example, the propulsion control unit 112 and the tracking control unit 122 (shown in FIG. 1) are configured as shown in FIG. 2. In at least one example, the control unit 200 includes at least one processor 202 in communication with a memory 204. The memory 204 stores instructions 206, received data 208, and generated data 210. The control unit 200 shown in FIG. 5 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the propulsion control unit 112 and the tracking control unit 122 may be or include one or more processors that are configured to control operation, as described herein.

The propulsion control unit 112 and the tracking control unit 122 are configured to execute a set of instructions that are stored in one or more data storage units or elements (such as one or more memories), in order to process data. For example, the propulsion control unit 112 and the tracking control unit 122 may include or be coupled to one or more memories. The data storage units may also store data or other information as desired or needed. The data storage units may be in the form of an information source or a physical memory element within a processing machine.

The set of instructions may include various commands that instruct the propulsion control unit 112 and the tracking control unit 122 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the propulsion control unit 112 and the tracking control unit 122. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the propulsion control unit 112 and the tracking control unit 122 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
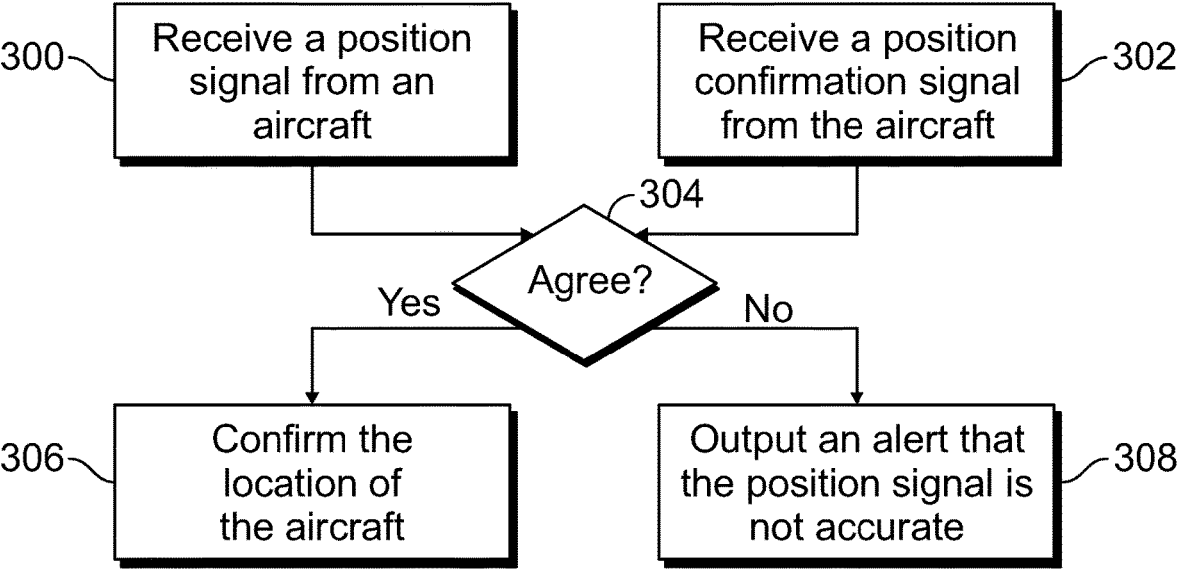
FIG. 3 illustrates a method for confirming an identity and position of aircraft within an airspace, according to an example of the present disclosure.

FIG. 3 illustrates a method for confirming an identity and/or position of aircraft within an airspace, according to an example of the present disclosure. Referring to FIGS. 1-3, the method includes receiving, at 300, the position signal 124 from the aircraft 102. The tracking sub-system 118 receives the position signal 124. At 302, the position confirmation signal 126 from the aircraft 102 is received. The tracking sub-system 118 receives the position confirmation signal 126. Steps 300 and 302 can occur concurrently. Optionally, step 300 can occur before step 302, or vice versa.

At 304, the tracking control unit 122 of the tracking sub-system 118 determines if the position signal 124 agrees (that is, indicates the location information that is consistent with) the position confirmation signal 126. If, at 304, the tracking control unit 122 determines that the position signal 124 agrees with the position confirmation signal 126, the method proceeds to 306, at which the tracking control unit 122 confirms the location of the aircraft 102 within the airspace 104. The tracking control unit 122 can then output a location confirmation message, such as a graphic or audio message on a user interface at the monitoring center 116 and/or the aircraft 102. If, however, the tracking control unit 122 determines that the position signal 124 does not agree with the position confirmation signal 126 at 304, the method proceeds to 308, at which the tracking control unit 122 indicates a difference between the position signal 124 and the position confirmation signal 126, and outputs an alert (such as on the user interface) that the position signal 124 is not accurate.

Figure 4:
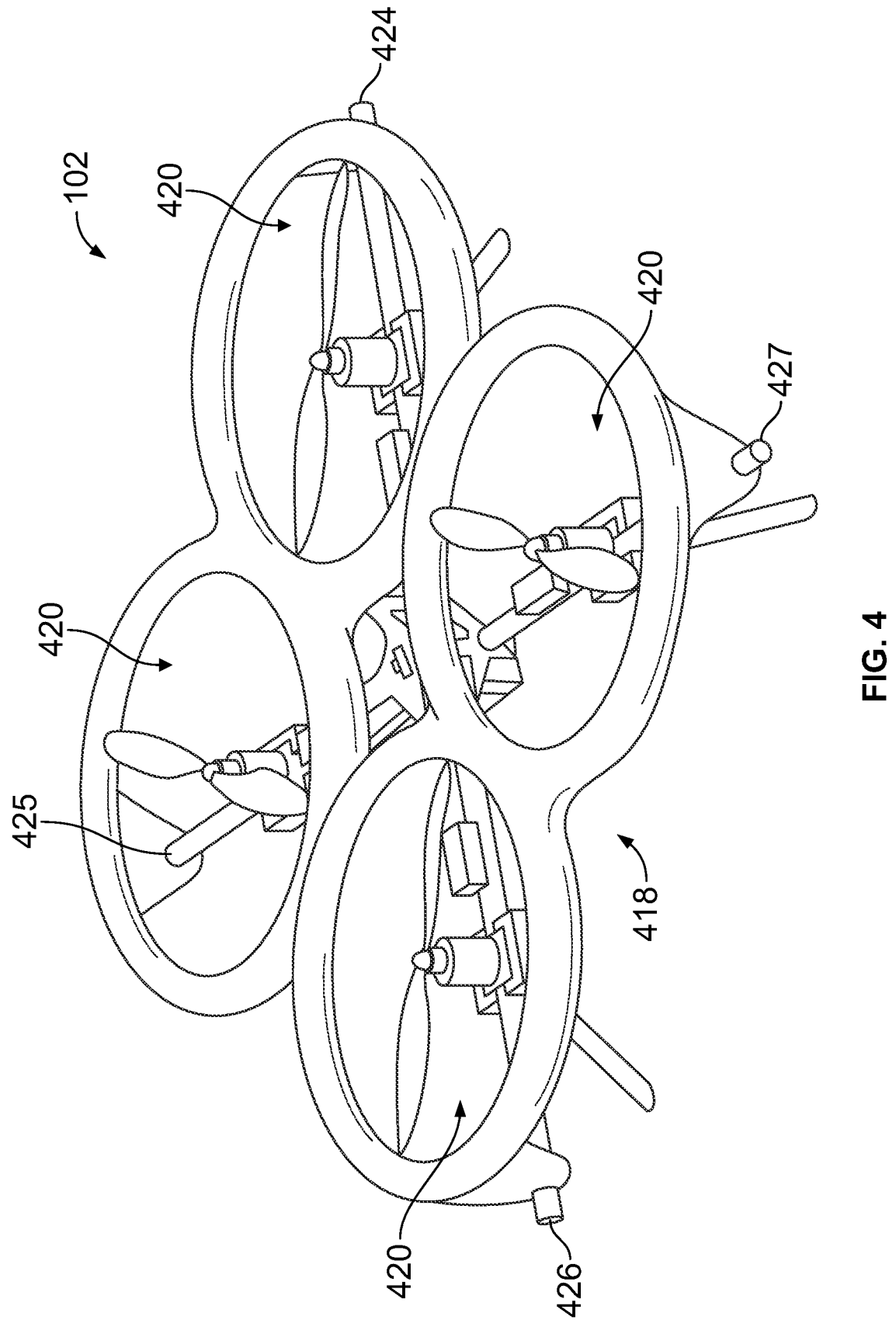
FIG. 4 illustrates a top view of an example of an aircraft, according to an example of the present disclosure.

FIG. 4 illustrates a top view of an example of an aircraft 102, according to an example of the present disclosure. As shown, the aircraft 102 is an unmanned aerial vehicle (UAV), which may include an airframe 418 and one or more propulsion systems 420 coupled to the airframe 418. At least one of the propulsion systems 420 is an example of the propulsion system 106 shown in FIG. 1. A plurality of the propulsion systems 420 can share a common propulsion control unit 112, such as shown in FIG. 1. Optionally, each of the propulsion systems 420 can include its own propulsion control unit 112.

In general, the airframe 418 forms the structural body or framework for the aircraft 102. In the illustrated example shown in FIG. 4, the aircraft 102 includes four propulsion systems 420, such that each propulsion system 420 is mounted to a respective arm 424, 425, 426, and 427. In the illustrated example, the aircraft 102 includes four arms 424-427 and a single propulsion system 420 that is mounted to each respective arm 424-427. Optionally, the aircraft 102 may include more or less propulsion systems 420, more or less propulsion systems 420 per arm 424-427, and more or less arms 424-427 than shown.

Also, optionally, instead of the UAV shown in FIG. 4, the aircraft 102 may be include a fuselage, wings, a tail, and the like. In this manner, the aircraft 102 may be designed as an unmanned airplane.

FIG. 5 illustrates a front perspective view of an aircraft 102, according to an example of the present disclosure. The aircraft 102 includes a propulsion system 112 that includes two engines 514, for example. The engines 514 can be or otherwise include electric motors. As another example, the engines 514 can be gas turbine engines. Optionally, the propulsion system 112 may include more engines 514 than shown. The engines 514 are carried by wings 516 of the aircraft 102. In other examples, the engines 514 may be carried by a fuselage 518 and/or an empennage 520. The empennage 520 may also support horizontal stabilizers 522 and a vertical stabilizer 524.

The fuselage 518 of the aircraft 102 defines an internal cabin, which may include a cockpit, one or more work sections (for example, galleys, personnel carry-on baggage areas, and the like), one or more passenger sections (for example, first class, business class, and coach sections), and an aft section. The aircraft 102 can be a commercial jet, for example. Optionally, the aircraft 102 can be a military aircraft, which can be configured differently than shown.

Figure 6:
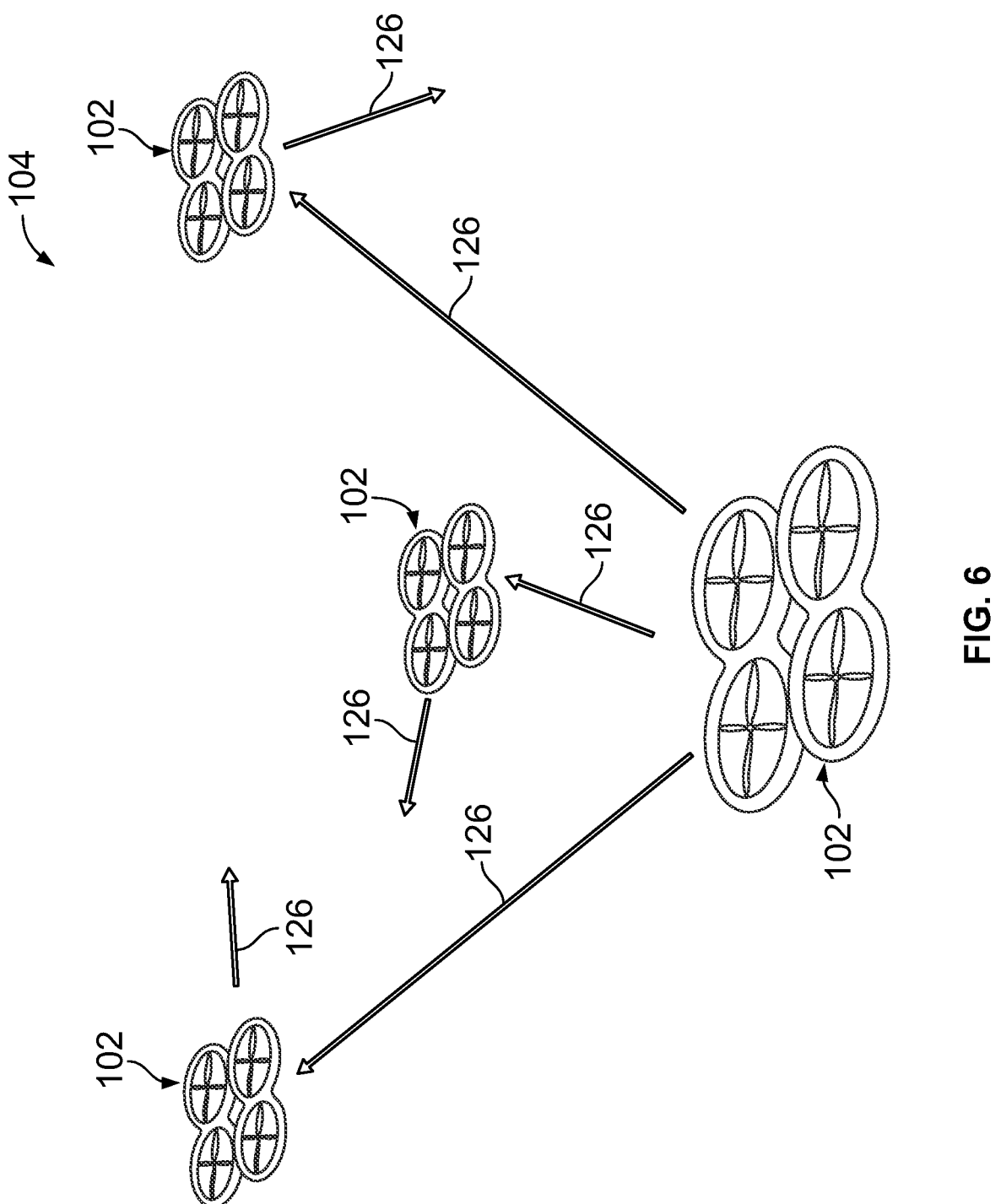
FIG. 6 illustrates a schematic diagram of a plurality of aircraft within an airspace, according to an example of the present disclosure.

FIG. 6 illustrates a schematic diagram of a plurality of aircraft 102 within an airspace 104, according to an example of the present disclosure. The propulsion systems 106 (shown in FIG. 1) of the aircraft 102 output the position confirmation signals 126, as described herein. In at least one example, the position confirmation signals 126 are audio signals. Referring to FIGS. 1 and 6, in at least one example, the tracking control unit 122 constantly records the position confirmation signals 126 in a loop. When location information is to be analyzed, a desired window of data including the recorded position confirmation signals 126 can be analyzed by the tracking control unit 122.

Further, the position confirmation signals 126 output by the plurality of aircraft 102 can be crowd sourced for greater resiliency and accuracy. For example, the tracking control unit 122 can federate the various aircraft 102 and analyze their respective position confirmation signals 126 to increase accuracy and resistance to spoofing. As an example, the plurality of aircraft 102 can share bounded location estimates to improve collective resistance to spoofing attempts. For example, the tracking control unit 122 not only reads the location and identification information from the position confirmation signals 126, the tracking control unit 122 can also analyze the physical characteristics of the carrier signal (for example, the audio position confirmation signal 126) to approximate a location of the detected aircraft 102. As such, even an untrusted sender is limited in how much it can spoof a location. In a crowd-sourced variant, such limiting is even more stringent. In short, the location information can be physically anchored, such as via the physics of the carrier (that is, the audio position confirmation signal 126).

In at least one example, one or more of the aircraft 102 can include a tracking control unit 122, such as shown in FIG. 1. Further, at least one of the aircraft 102 can include multiple transmitters for outputting one or more position confirmation signals 126 to the tracking control unit 122 of the monitoring center 116 and/or of the other aircraft 102. By using additional transmitters to output position confirmation signals 126 in different directions, the system 100 can enhance its ability to locate specific aircraft 102. In this manner, the system 100 can use targeted sensing to handle crowded environments.

Figure 7:
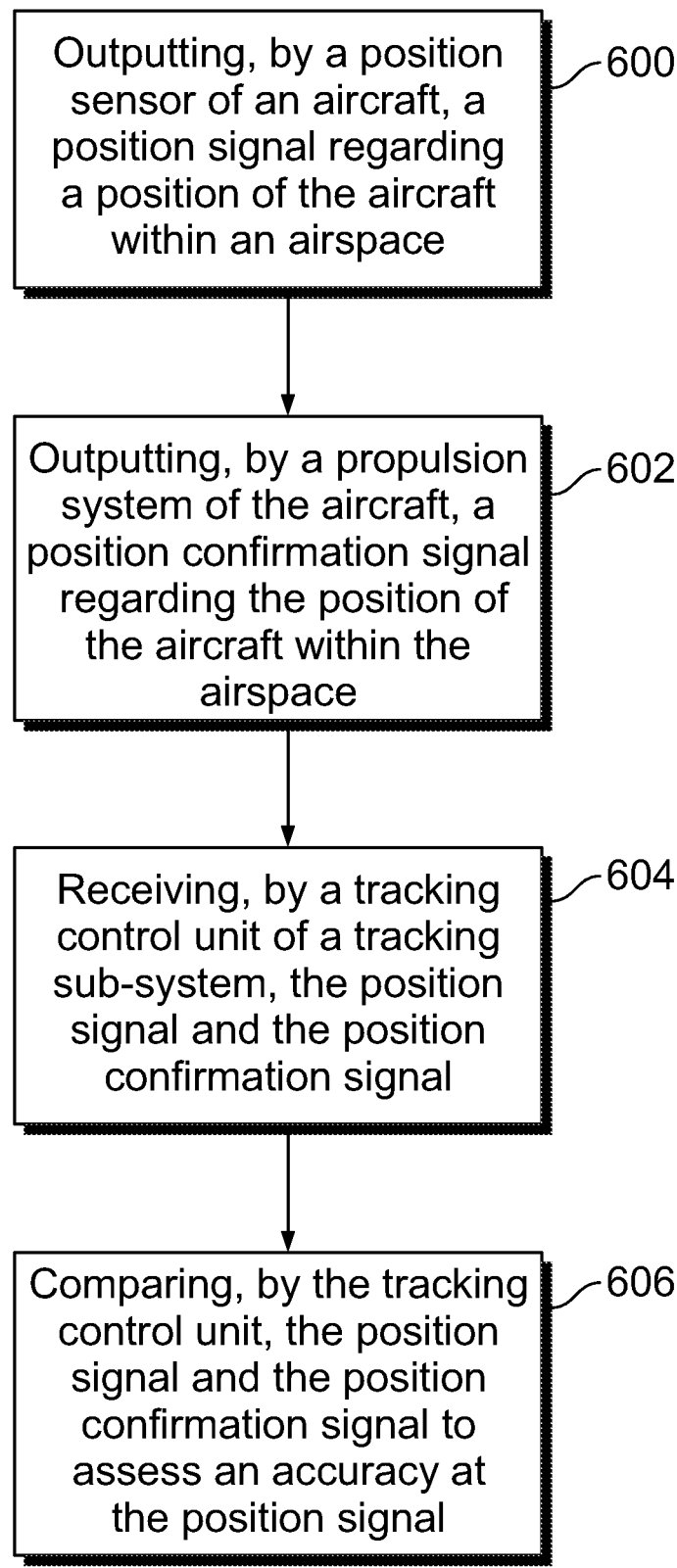
FIG. 7 illustrates a flow chart of a method for confirming an identity of aircraft within an airspace, according to example of the present disclosure.

FIG. 7 illustrates a flow chart of a method for confirming an identity of aircraft within an airspace, according to example of the present disclosure. Referring to FIGS. 1 and 7, the method includes outputting at 600, by the position sensor 108 of the aircraft 102, the position signal 124 regarding a position of the aircraft 102 within the airspace 104; and outputting at 602, by the propulsion system 106 of the aircraft 102, the position confirmation signal 126 regarding the position of the aircraft 102 within the airspace 104. In at least one example, the method also includes receiving at 604, by the tracking control unit 122 of the tracking sub-system 118, the position signal 124 and the position confirmation signal 126; and comparing at 606, by the tracking control unit 122, the position signal 124 and the position confirmation signal 126 to assess an accuracy of the position signal 124. In at least one example, the method also includes encoding, by the propulsion control unit 112, a location signal 128 on an audio signal 130 output by the motor 110 to provide the position confirmation signal 126.

Further, the disclosure comprises examples according to the following clauses:

Clause 1. A system comprising:

an aircraft including a position sensor configured to output a position signal regarding a position of the aircraft within an airspace, and a propulsion system configured to output a position confirmation signal regarding the position of the aircraft within the airspace.

Clause 2. The system of Clause 1, further comprising a tracking sub-system including a tracking control unit configured to receive the position signal and the position confirmation signal, wherein the tracking control unit is further configured to compare the position signal and the position confirmation signal to assess an accuracy of the position signal.

Clause 3. The system of Clauses 1 or 2, wherein the position sensor is an automatic dependent surveillance-broadcast (ADS-B) communication device.

Clause 4. The system of any of Clauses 1-3, wherein the aircraft is an unmanned aerial vehicle (UAV), a commercial aircraft, or a military aircraft.

Clause 5. The system of any of Clauses 1-4, wherein the propulsion system comprises a motor in communication with a propulsion control unit.

Clause 6. The system of Clause 5, wherein the motor is an electric motor.

Clause 7. The system of Clauses 5 or 6, wherein the propulsion control unit encodes a location signal on an audio signal output by the motor to provide the position confirmation signal.

Clause 8. The system of Clause 7, wherein the location signal comprises:
a location of the aircraft within the airspace; and
an identification of the aircraft.

Clause 9. The system of Clause 8, wherein the location signal further comprises a timestamp.

Clause 10. A method comprising:

outputting, by a position sensor of an aircraft, a position signal regarding a position of the aircraft within an airspace; and outputting, by a propulsion system of the aircraft, a position confirmation signal regarding the position of the aircraft within the airspace.

Clause 11. The method of Clause 10, further comprising:
receiving, by a tracking control unit of a tracking sub-system, the position signal and the position confirmation signal; and
comparing, by the tracking control unit, the position signal and the position confirmation signal to assess an accuracy of the position signal.

Clause 12. The method of Clauses 10 or 11, wherein the position sensor is an automatic dependent surveillance-broadcast (ADS-B) communication device.

Clause 13. The method of any of Clauses 10-12, wherein the aircraft is an unmanned aerial vehicle (UAV), a commercial aircraft, or a military aircraft.

Clause 14. The method of any of Clauses 10-13, wherein the propulsion system comprises a motor in communication with a propulsion control unit.

Clause 15. The method of Clause 14, wherein the motor is an electric motor.

Clause 16. The method of Clauses 14 or 15, further comprising encoding, by the propulsion control unit, a location signal on an audio signal output by the motor to provide the position confirmation signal.

Clause 17. The method of Clause 16, wherein the location signal comprises:
a location of the aircraft within the airspace; and
an identification of the aircraft.

Clause 18. The method of Clause 17, wherein the location signal further comprises a timestamp.

Clause 19. A system comprising:

an aircraft including a position sensor configured to output a position signal regarding a position of the aircraft within an airspace, and a propulsion system configured to output a position confirmation signal regarding the position of the aircraft within the airspace, wherein the position sensor is an automatic dependent surveillance-broadcast (ADS-B) communication device, wherein the propulsion system comprises a motor in communication with a propulsion control unit, and wherein the propulsion control unit encodes a location signal on an audio signal output by the motor to provide the position confirmation signal; and a tracking sub-system including a tracking control unit configured to receive the position signal and the position confirmation signal, wherein the tracking control unit is further configured to compare the position signal and the position confirmation signal to assess an accuracy of the position signal.

Clause 20. The system of Clause 19, wherein the location signal comprises:
a location of the aircraft within the airspace;
an identification of the aircraft; and
a timestamp.

As described herein, examples of the present disclosure provide systems and methods for securely and accurately confirming an identity of an aircraft within an airspace. Further, examples of the present disclosure provide systems and methods that provide cyber resilience to tracking systems, such as ADS-B systems. Moreover, examples of the present disclosure provide efficient and inexpensive systems and methods for securely and accurately confirming an identity of aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
an aircraft including:
a position sensor configured to output a position signal regarding a position of the aircraft within an airspace; and
a propulsion system configured to output a position confirmation signal regarding the position of the aircraft within the airspace, wherein the propulsion system comprises a motor in communication with a propulsion control unit including one or more processors, and wherein the propulsion control unit is configured to encode a location signal on an audio signal output by the motor to provide the position confirmation signal.

2. The system of claim 1, further comprising a tracking sub-system including a tracking control unit configured to receive the position signal and the position confirmation signal, wherein the tracking control unit is further configured to compare the position signal and the position confirmation signal to assess an accuracy of the position signal.

3. The system of claim 1, wherein the position sensor is an automatic dependent surveillance-broadcast (ADS-B) communication device.

4. The system of claim 1, wherein the aircraft is an unmanned aerial vehicle (UAV), a commercial aircraft, or a military aircraft.

5. The system of claim 1, wherein the motor is an electric motor.

6. The system of claim 1, wherein the location signal comprises:
a location of the aircraft within the airspace; and
an identification of the aircraft.

7. The system of claim 6, wherein the location signal further comprises a timestamp.

8. The system of claim 1, wherein the propulsion control unit is further configured to:
modulate an output of the motor to provide a modulated noise signal, and
embed the position confirmation signal in the modulated noise signal output by the motor.

9. The system of claim 1, wherein the propulsion control unit is further configured to modulate an amplitude or frequency of the position confirmation signal to define a desired audio channel.

10. A method comprising:
outputting, by a position sensor of an aircraft, a position signal regarding a position of the aircraft within an airspace;
encoding, by a propulsion control unit of a propulsion system of the aircraft, a location signal on an audio signal output by a motor of the propulsion system to provide a position confirmation signal regarding the position of the aircraft within the airspace, and wherein the motor is in communication with the propulsion control unit; and
outputting, by the propulsion system of the aircraft, the position confirmation signal.

11. The method of claim 10, further comprising:
receiving, by a tracking control unit of a tracking sub-system, the position signal and the position confirmation signal; and
comparing, by the tracking control unit, the position signal and the position confirmation signal to assess an accuracy of the position signal.

12. The method of claim 10, wherein the position sensor is an automatic dependent surveillance-broadcast (ADS-B) communication device.

13. The method of claim 10, wherein the aircraft is an unmanned aerial vehicle (UAV), a commercial aircraft, or a military aircraft.

14. The method of claim 10, wherein the motor is an electric motor.

15. The method of claim 10, wherein the location signal comprises:
a location of the aircraft within the airspace; and
an identification of the aircraft.

16. The method of claim 15, wherein the location signal further comprises a timestamp.

17. The method of claim 10, further comprising:
modulating, by the propulsion control unit, an output of the motor to provide a modulated noise signal, and
embedding, by the propulsion control unit, the position confirmation signal in the modulated noise signal output by the motor.

18. The method of claim 10, further comprising modulating, by the propulsion control unit, an amplitude or frequency of the position confirmation signal to define a desired audio channel.

19. A system comprising:
an aircraft including:

a position sensor configured to output a position signal regarding a position of the aircraft within an airspace; and a propulsion system configured to output a position confirmation signal regarding the position of the aircraft within the airspace, wherein the position sensor is an automatic dependent surveillance-broadcast (ADS-B) communication device, wherein the propulsion system comprises a motor in communication with a propulsion control unit including one or more processors, and wherein the propulsion control unit encodes a location signal on an audio signal output by the motor to provide the position confirmation signal; and a tracking sub-system including a tracking control unit configured to receive the position signal and the position confirmation signal, wherein the tracking control unit is further configured to compare the position signal and the position confirmation signal to assess an accuracy of the position signal.

20. The system of claim 19, wherein the location signal comprises:

a location of the aircraft within the airspace;

an identification of the aircraft; and a timestamp.

* * * * *